Nov. 10, 1953
A. G. EMSLIE
2,659,076
MOVING OBJECT RADIO PULSE-ECHO SYSTEM
Filed May 17, 1945
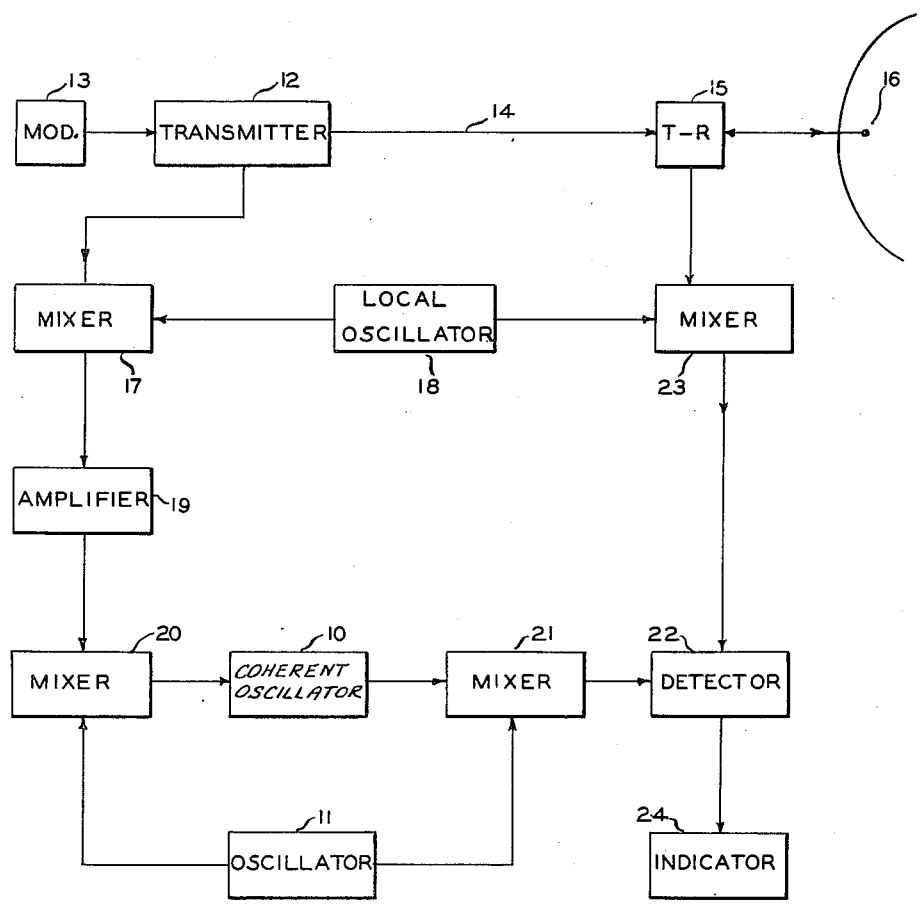
INVENTOR.
ALFRED G. EMSLIE
BY
*William D. Hall*
ATTORNEY Patented Nov. 10, 1953

2,659,076

UNITED STATES PATENT OFFICE 2,659,076

MOVING OBJECT RADIO PULSE-ECHO SYSTEM

Alfred G. Emslie, Boston, Mass., assignor, by mesne assignments, to the United States of America as represented by the Secretary of War Application May 17, 1945, Serial No. 594,261

5 Claims. (Cl. 343—7.7)

The present invention relates to radio object-location systems of a character adapted to distinguish fixed-objects from moving-objects; and it relates more particularly to coherent pulse-echo systems wherein a reference oscillator operates at a sub-intermediate-frequency.

A coherent pulse-echo system is a radio object-location system which transmits exploratory object-locating pulses in the usual manner, and which, in addition, utilizes reference oscillations locked in fixed phase (in coherence) with respect to the transmitted exploratory pulses. The reference oscillations, or timing wave as they are sometimes called, may be generated by a relatively stable oscillator, referred to as a coherent oscillator which is phased in relation to the exploratory pulses. Echo-pulses returning from a reflecting object are algebraically combined with the coherent reference oscillations, and from said combination video pulses are produced which may be applied to a suitable indicator.

Differentiation between fixed-objects and moving-objects is contingent upon the fact that fixed-object returned echo-pulses will always have the same phase relative to the timing wave, and hence, when combined therewith, will provide constant-amplitude video pulses. On the other hand successive echo-pulses from a moving-object will have a progressive phase shift relative to said timing wave, and when combined therewith, will reinforce or oppose said timing wave depending upon the relative phase between the two. The reinforcing and opposing actions are periodic, and the video pulses obtained have a cyclically varying amplitude, the periodic variation being a function of object velocity.

Fixed-objects, therefore, are manifested by constant amplitude video pulses whereas moving-objects are manifested by video pulses having a cyclical variation of amplitude. This cyclical variation may be utilized as an indication of the presence of a moving-object, and of the objects' radial velocity relative to the location of the system. Presentation of this information may be achieved by means of either an aural or visual indicator.

It is to be understood that the term carrier-frequency of a pulse as hereinafter used refers to the center frequency of the band of frequencies contained in the pulse.

Object-returned echo-pulses may be combined with a timing wave whose frequency is substantially equal to the carrier-frequency of the pulses themselves, or they may be reduced to an intermediate-frequency and then combined with a timing wave of substantially that frequency. In general it is preferable to utilize an intermediate-frequency timing wave which may be generated by a stable intermediate-frequency oscillator (referred to as a coho) synchronized in a suitable manner to the transmitted exploratory pulses. A system of the general character described above which employs intermediate-frequency reference oscillations is more fully described in a copending application of Rober H. Dicke, Serial No. 590,052, filed April 24, 1945, issued December 26, 1950, as Patent No. 2,535,274.

It has been found generally desirable to utilize a crystal-controlled coherent oscillator to generate the required stable reference oscillations. With such a generator, the phase of said oscillations can be more easily fixed with respect to the phase of the exploratory pulses, if the crystal is operating at its fundamental frequency. At the intermediate-frequencies presently used in coherent pulse-echo systems, crystals operating at their fundamental frequency are so fragile that their use may be generally impractical.

It is an object of the present invention, therefore, to provide an improved coherent pulse-echo system wherein the reference oscillations are generated at a sub-intermediate-frequency.

It is another object of the invention to provide an improved coherent pulse-echo system wherein the reference oscillations may be generated by a crystal-controlled coherent oscillator, and wherein said crystal operates at its fundamental frequency.

The invention, however, will be further understood from the following description when considered in connection with the accompanying drawing in which the single figure shows in block diagram form, one embodiment of the present invention.

Referring now to the drawing, the present system includes a stable sub-intermediate-frequency coherent oscillator 10, which may be a crystal-controlled oscillator, adapted to operate at the fundamental frequency of the crystal. As mentioned above, coherent oscillator 10 is synchronized or locked in phase with the transmitted exploratory pulses. Oscillator 11 must also be frequency stable, and may likewise be crystal-controlled, but as it need not be locked in phase with the exploratory pulses, the crystal may operate at a harmonic of its fundamental-frequency.

Short duration, high carrier-frequency exploratory pulses of radiant energy are generated by a transmitter 12 pulsed by modulator 13.

Transmitter 12 may comprise a magnetron or other suitable ultra-high frequency generator. Exploratory pulses issuing from transmitter 12 are fed by a suitable transmission system 14 through transmit-receive (T–R) switch 15 to a directional antenna 16.

The function of transmit-receive switch 15 is to connect directional antenna 16 to transmitter 12 during the period while pulses are being transmitted. During the interim between transmitted pulses and while object-returned echo-pulses are being received antenna 16 is disconnected from transmitter 12, and connected to other components of the system, as will be presently described.

A portion of the transmitted exploratory pulses may be applied to mixer 17, a second input to mixer 17 being one output from a local oscillator 18. The beat frequency output of mixer 17 consists of pulses having an intermediate-frequency carrier-wave which may be applied to intermediate-frequency amplifier 19. The amplified pulse output therefrom may then be applied to mixer 20; a second input to mixer 20 being an output from stable oscillator 11. The function of mixer 20 is to adapt the pulse input thereto for use as locking pulses for coherent oscillator 10. The output circuit of mixer 20 is tuned to the difference of the two input frequencies to produce a coho locking pulse having that carrier-frequency. This carrier-frequency may be referred to as a sub-intermediate carrier-frequency and coherent oscillator 10 is adapted to oscillate at substantially the same sub-intermediate frequency. The locking pulses from mixer 20 are applied to oscillator 10 to synchronize said oscillator so that the continuous wave output thereof has a fixed-phase relation with respect to the transmitted exploratory pulses.

The frequency-stable output of synchronized oscillator 10 is then applied to mixer 21, a second input to mixer 21 consisting of stable oscillations from oscillator 11. The two inputs to mixer 21 are combined therein to produce output reference oscillations (timing wave) having the intermediate-frequency of the system, where said intermediate frequency is substantially the same as the carrier-wave frequency of the pulse issuing from mixer 17. The intermediate-frequency reference oscillations may then be applied to detector 22 as a timing wave.

Object returned echo-pulses received at antenna 16 are fed through transmit-receive switch 15 to mixer 23, another input to mixer 23 comprising the other output oscillations from local oscillator 18. The beat frequency output of mixer 23 consists of object-returned echo-pulses, having an intermediate-frequency carrier-wave. This output is applied as a second input to detector 22.

In detector 22, the timing wave and the object-returned echo-pulses are combined in an algebraic manner to obtain an oscillatory voltage, the envelope of which is obtained therein to provide video pulses. The video pulses representing fixed-objects will have a constant amplitude, as mentioned above, whereas those representing moving-objects will have a periodic variation in amplitude. As previously mentioned, the frequency of this cyclical variation in amplitude provides an indication of the presence and radial velocity of moving-objects with respect to the system. Video pulses issuing from detector 22 may then be applied to indicator 24 which may present velocity information either aurally or visually.

It is to be understood that the terms "reference oscillations" and "timing wave" as used in the specification and claims are synonymous.

While there has been here described one embodiment of the present invention, it will be manifest to those skilled in the art that various changes and modifications may be made therein without departing from the invention. It is therefore aimed in the appended claims to cover all such changes and modifications as fall within the spirit and scope of the invention.

I claim:

1. In a radio object-location system wherein short duration, high carrier-frequency exploratory pulses of radiant energy are transmitted, and wherein the carrier-frequency of a portion of each of said exploratory pulses is reduced to an intermediate-frequency; a first mixer, means for introducing said intermediate-carrier-frequency pulses to said first mixer, a substantially frequency stable oscillator, means for applying the output of said oscillator to said first mixer to obtain as an output from said first mixer a pulse having a sub-intermediate-carrier-frequency, a frequency stable reference oscillator whose output frequency substantially equals the sub-intermediate-carrier-frequency, means for applying said last-mentioned pulse to said reference oscillator as a locking pulse, a second mixer, means for applying as an input to said second mixer the output of said reference oscillator, means for introducing the output of said first-mentioned oscillator as a second input to said second mixer, the output of said second mixer being a timing wave, a detector circuit, means for applying said timing wave to said detector circuit, receiving means for object-returned echo-pulses, means for reducing the carrier-frequency of said echo-pulses to a frequency substantially equal to the frequency of said timing wave, means for applying the reduced frequency echo-pulses to said detector circuit, means in said detector circuit for combining said echo-pulses and said timing wave to obtain an oscillatory voltage, means for obtaining the envelope of said oscillatory voltage to provide video pulses, and indicating means for said video pulses, the modulation envelope of a plurality of said video pulses providing object velocity information.

2. In a radio object-location system of the character described including a superheterodyne receiver, means for generating short-duration, high carrier-frequency exploratory pulses of radiant energy, transmitting means for said exploratory pulses, a crystal-controlled frequency stable reference oscillator having a frequency less than the intermediate frequency of said receiver and wherein the crystal in said crystal-controlled oscillator is adapted to operate at substantially its fundamental-frequency, means for synchronizing the phase of said reference oscillator with said transmitted exploratory pulses, a second frequency stable oscillator having a frequency equal to the difference between said intermediate frequency and the frequency of said reference oscillator, a mixer, and means for applying the outputs of said crystal-controlled oscillator and said second oscillator thereto, the output of said mixer including intermediate-frequency reference oscillations, means for receiving object-returned echo-pulses, heterodyning means for reducing the carrier-frequency of said object-returned echo-pulses to the frequency of said reference oscillations, and means for combining said intermediate carrier-frequency echo-pulses with said reference oscillations to produce video pulses, said video pulses providing object velocity information.

3. In a radio object-location system of the character described including a superheterodyne receiver, means for generating and transmitting short-duration, high carrier-frequency exploratory pulses of radiant energy, a frequency stable reference oscillator having a frequency less than the intermediate frequency of said receiver, means for synchronizing the phase of said reference oscillator with said transmitted exploratory pulses, a second frequency stable oscillator having a frequency equal to the difference between said intermediate frequency and the frequency of said reference oscillator, a mixer and means for applying the outputs of said reference and said second-mentioned oscillators thereto, the output of said mixer including intermediate-frequency reference oscillations, means for receiving object-returned echo-pulses, heterodyning means for reducing the carrier-frequency of said object-returned echo-pulses to the frequency of said reference oscillations, and means for combining said intermediate-carrier-frequency echo-pulses with said reference oscillations to produce video pulses.

4. In a radio object-location system of the character described including a superheterodyne receiver, means for generating and transmitting short-duration, high carrier-frequency exploratory pulses of radiant energy, a frequency stable reference oscillator having a frequency less than the intermediate frequency of said receiver, means for generating in synchronism with said exploratory pulses synchronizing pulses of oscillations having the same frequency as that of said reference oscillator means for synchronizing the phase of said reference oscillator with said synchronizing pulses, a second frequency stable oscillator having a frequency equal to the difference between said intermediate frequency and the frequency of said reference oscillator, means for combining the outputs of said reference oscillator and said second-mentioned oscillator to obtain a timing wave of said intermediate frequency, means for receiving object-returned echo-pulses, heterodyning means for reducing the carrier-frequency of said echo-pulses to a frequency equal to the frequency of said timing wave, and means for combining said reduced carrier-frequency pulses and said timing wave to obtain video pulses.

5. A radio object-location system including means for generating and transmitting short-duration, high carrier-frequency exploratory pulses of radiant energy, means for receiving object-returned echo-pulses, means for deriving intermediate frequency energy from said generated high carrier-frequency energy, a frequency stable oscillator operating at a frequency less than said intermediate frequency, means for synchronizing the phase of said oscillator with said intermediate frequency energy, frequency converting means for changing the output of said oscillator to reference oscillations of the intermediate frequency, heterodyning means for reducing the carrier-frequency of the received echo-pulses to substantially the said intermediate frequency, and means for combining the received echo-pulses of intermediate carrier-frequency with the reference oscillations for comparing the phase of said object-returned echo-pulses with respect to said reference oscillations to provide an indication of object velocity.

ALFRED G. EMSLIE.

References Cited in the file of this patent
UNITED STATES PATENTS

| Number | Name | Date |
| --- | --- | --- |
| 1,982,340 | Forbes | Nov. 27, 1934 |
| 2,253,589 | Southworth | Aug. 26, 1941 |
| 2,321,315 | Peterson | June 8, 1943 |
| 2,406,316 | Blumlein | Aug. 27, 1946 |
| 2,479,568 | Hansen | Aug. 23, 1949 |
| 2,535,274 | Dicke | Dec. 26, 1950 |